United States Patent [19]

Vento

[11] Patent Number: 5,582,777
[45] Date of Patent: Dec. 10, 1996

[54] LIVE WELL AERATOR AND METHOD FOR AERATION

[75] Inventor: Thomas J. Vento, New Port Ritchey, Fla.

[73] Assignee: KeepAlive, Inc., Tarpon Springs, Fla.

[21] Appl. No.: 432,966

[22] Filed: May 1, 1995

[51] Int. Cl.⁶ ............................................. B01F 3/04
[52] U.S. Cl. ........................ 261/93; 261/121.2; 261/64.1
[58] Field of Search ............................... 261/121.2, 93, 261/64.1

[56] References Cited

U.S. PATENT DOCUMENTS

| | | | |
|---|---|---|---|
| 1,985,153 | 12/1934 | Daman | 261/93 |
| 2,047,643 | 7/1936 | Mayer et al. | 261/93 |
| 2,178,239 | 10/1939 | McKenna | 261/93 |
| 2,280,979 | 4/1942 | Rocke | 261/93 |
| 2,393,976 | 2/1946 | Daman et al. | 261/93 |
| 2,865,618 | 12/1958 | Abell . | |
| 3,279,768 | 10/1966 | Niewiarowicz | 261/93 |
| 4,917,577 | 4/1990 | Stirling | 261/93 |
| 4,994,177 | 2/1991 | Bogar, Jr. | 210/167 |
| 5,077,932 | 1/1992 | Hetherington | 261/121.2 |
| 5,213,718 | 5/1993 | Burgess | 261/93 |
| 5,275,762 | 1/1994 | Burgess | 261/121.2 |
| 5,458,816 | 10/1995 | Ebner et al. | 261/93 |

FOREIGN PATENT DOCUMENTS

| | | | |
|---|---|---|---|
| 108227 | 8/1939 | Australia | 261/93 |

OTHER PUBLICATIONS

Memphis Wet & Twine Co., Inc. Shopper's Specials., Memphis TN 38108, Catalog, 1995.

*Primary Examiner*—Tim R. Miles
*Attorney, Agent, or Firm*—Dominik & Stein

[57] ABSTRACT

An aerator designed for aeration of a live bait well and comprising a centrifugal type pump comprising an impeller and an impeller casing having an inlet and an outlet, wherein the inlet is in communication with water from the bait well and also with air via an air conduit. The air conduit is provided with metering means for metering the amount of air entering the impeller and for optimizing the mincing of air in the fluid (which is a different technical phenomena from simply pumping an air/water mixture). The bubbles produced in accordance with the present invention are so fine as to give the water a fogged appearance. The unusually high level of oxygenation makes it possible for the first time to pack two to four times as many bait fish into a live well as had previously been considered possible.

8 Claims, 5 Drawing Sheets

LIVE WELL AERATOR AND METHOD FOR AERATION

BACKGROUND OF THE INVENTION

1. Field Of the Invention

The present invention is directed to an aerator, and more particularly, an aerator for oxygenating a live bait well.

2. Description of the Related Art

When fishing from a boat, it is a common practice to bring along bait fish in tanks known as live wells. In order to keep the bait fish alive for many hours, an aerator is provided to replenish the oxygen in the water as it is depleted by the bait fish. Several distinct types of aerators have been developed.

For example, U.S. Pat. No. 3,822,498 teaches an aerator for a live well wherein water is sucked through a pump and sprayed out a distributor manifold in the form of small jets above the surface of the water. As the jets pass through the air and then strike the surface of the water, the water picks up oxygen. These systems are, however, disadvantageous for a number of reasons.

First, it is inevitable that jets of water will strike the fish and wash away the mucus outer coating which protects the fish. Second, energy consumption is high. Third, while the surface area of the live well may be aerated, the lower reaches of the bait well are not aerated, particularly when a large number of bait fish are kept in the bait well. Finally, aeration efficiency is relatively low, so that the total number of bait fish which can be kept in the well is correspondingly limited.

U.S. Pat. No. 5,321,789 teaches a bait container wherein an aeration pump causes air to bubble up from the bottom of the container to thereby aerate the water. The aerator utilizes a conventional pump, such as a piston or a diaphragm-type pump, as is well-known in the art. The amount of oxygen actually dissolved in the water by this system is, however, severely limited.

U.S. Pat. No. 5,139,659 teaches an air-lift water pump, aerator and filter. Pressurized air is supplied to the bottom of a manifold at which point the air is broken to small bubbles by a bubble reducer. These bubbles travel up a water-lift tube, bringing along entrained water. The water thus moved passes over a filter and recirculates to the tank. This system is suitable for the long-term maintenance of a small number of fish, but is unsuitable for the short-term maintenance of a large number of fish.

A further type of well-known aerator employs a motor driven propeller near the surface of the water. The propeller may be directed upwardly to cause water to be sprayed upwardly, or the propeller may be directed downwardly to cause air to be drawn under water. This type of aeration is inefficient in that a large amount of mechanical energy is required, and oxygenation occurs mainly only near the water surface. Recently a variation on this propeller type of aerator has been developed. The aerator comprises a motor mounted above the water, a downwardly directed propeller below the surface of the water, an air tube between the surface of the water and the propeller, and a shaft connecting the propeller to the motor and extending through the air tube. As the propeller spins, it creates a suction at the bottom of the air tube, and an air stream is drawn down through the air tube whereupon it contacts the propeller and is broken into small bubbles. This aerator is intended to facilitate drawing air down to a deeper depth, and represents an improvement over the conventional propeller aerator in that oxygenation will occur at lower levels of the bait well. However, the arrangement requires the propeller to create suction on the air tube at the propeller depth. As result, the arrangement is effectively limited to shallow depths and relatively small bait wells such as minnow buckets. A further improvement is needed.

U.S. Pat. No. 4,917,577 teaches a high speed centrifugal oxygenator including (1) a frustro-conical shaped impeller chamber within which is mounted a similarly shaped mismatched impeller with blades significantly smaller than the chamber, the impeller chamber having a bottom inlet, and the bottom inlet having a venturi gas inlet for mixing gas with the flowing liquid. To be effective, the impeller must operate at very high speed in order for the flow of fluid through the bottom inlet to be sufficient to create a suction on, and draw gas through, the venturi gas inlet. This high flow rate would render the oxygenator impractical for use in small applications such as bait wells, since the high turbulence would be injurious to the bait fish. More importantly, since the impeller blades are significantly smaller than the impeller chamber, most of the fluid does not come into contact with the blades. This may be desirable where the objective is to achieve high flow, low agitation. However, where the object is to achieve a high rate of mixing of air into a relatively small volume of water, as would be required in a bait well application, this high speed centrifugal oxygenator is entirely unsuitable. Finally, the venturi gas inlets must be narrow to be effective as the pump is cycled through many ON-OFF periods, during which the venturi gas inlets will be flooded and dried, flooded and dried, resulting in sedimentation and encrustation. The venturi jets will require attention and cleaning over time.

U.S. Pat. No. 4,994,177 teaches a bait well wherein a pump, such as a bilge pump, is used to pump water up above the surface of the water and back down onto the water in the form of fine jets to thereby oxygenate the water. However, as discussed above, the oxygenation efficiency is low and the jets of water spraying on the bait fish are injurious to the bait fish.

U.S. Pat. No. 5,077,932 teaches a water aeration apparatus including a shaft driven, downwardly directed propeller located below the surface of the water, and an airway tube for delivering small amounts of air to an onlet on the top of the water intake side of the downwardly directed propeller. Rotation of the propeller draws water from the airway outlet and disperses the air into the water. This system is satisfactory for the short-term housing of a limited number of bait fish in a bait bucket. However, a significant improvement in oxygenation efficiency is needed where it is desired to house a significant number of bait fish in a live well.

Finally, U.S. Pat. Nos. 5,213,718 and 5,275,762 teach aerators wherein an impeller draws a water and air mixture down through an upwardly directed impeller inlet into a cavitation zone (i.e., the centrifugal pump is mounted upside down compared to the normal operating position). When the centrifugal pump rotates, the vacuum formed in the cavitation zone by rotation of the impeller will draw air through the air tube into the cavitation eye where a portion of the air will be entrained in the water flowing through the vaned impeller and out the water flow directing means into the tank. Excess air drawn into the cavitation eye through the inlet tube can escape upwardly through the water inlet thereby preventing air locking of the impeller, as would occur if air were to accumulate in the cavitation zone of a centrifugal pump mounted in the "normal" pump operating position, with the water inlet opening downwardly. The pump preferably floats on the water with the air/water inlet for the centrifugal pump immediately below the surface. Such a system has a number of attendant problems. First, a centrifugal pump is designed to be operated in a certain orientation. The pump may be operated upside down near the surface for periods of time without damage; however, if operated upside down at depth for any length of time, air in the motor housing will exit through the seal between the motor shaft and the impeller, and water will enter the motor housing causing damage. Further, if the pump is operated on the surface, oxygenation of the water will occur near the surface of the tank, and the lower reaches of the bait well will not be aerated.

Further yet, if the pump is operated at depth, the design must permit escape of excess air out through the water inlet so as to prevent air locking of the pump, or to permit flooding and restarting of an air-locked pump. The design must thus anticipate the various depths at which the pump may be operated, and the air-escape parameters for each depth. Such a design can not optimize the air/water mixture for maximum oxygenation of the pump at every given depth. As a result of these design constraints, the oxygenation efficiency is adequate, but much less than optimal.

What is needed is an aerator which delivers optimal oxygenation at any given depth of operation. Further, the aerator pump must operate in the orientation for which it was designed. Further, the aerator must operate at a depth where mechanical churning forces are optimal. Finally, what is needed is an oxygenator which can deliver two to four times the amount of dissolved oxygen to a given volume of water per amp.

In view of the foregoing, it is an object of the present invention to provide an aerator which eliminates or minimizes the above-mentioned and other problems, limitations and disadvantages typically associated with conventional aerators, and to provide an aerator which achieves a high level of oxygenation of the water in a live well and thereby makes possible the keeping of a larger number of bait fish per unit space than hitherto considered possible.

It is a further object of the invention to provide an aerator which has a gentle action and does not harm the bait fish.

It is yet a further object of the invention to provide an aerator which is highly energy-efficient and thus does not consume unnecessary electricity, is compact, simple to manufacture, easy to install and use, inexpensive, and reliable.

SUMMARY OF THE INVENTION

The present inventor has investigated and experimented with various aerators and pumps, and discovered that the introduction of a controlled amount of air into the upstream (suction) side leading to a centrifugal pump, such as a conventional rotary bilge pump, can result in a very thorough mincing of air and water and the output of very fine bubbles from the downstream (emission) side leading from the centrifugal pump. In fact, the bubbles are so fine as to give the water a fogged appearance. The unusually high level of oxygenation makes it possible for the first time to pack two to four times as many bait fish into a live well as had previously been possible.

Following extensive experimentation, the present inventor was able to determine that the above results could be attained in all cases only if (1) the size of the air inlet was controlled to a certain diameter, and (2) the air supplied to the inlet could be manually or automatically (via optical turbidity sensors, etc.) controlled so as to optimize the mechanical agitation of the air and the production of ultra-fine bubbles.

A preferred aerator of the present invention, designed for aeration of a live bait well, can comprise: a portable centrifugal type pump comprising an impeller and a pump casing having at least one inlet and one outlet with the impeller disposed between the pump casing inlet and outlet, wherein the at least one inlet is in communication with water from the bait well and also with air. The air is provided via piping, hose or tubing (hereafter air tube) and the air tube is provided with a petcock, valve, clamp, or other means by which the amount air being introduced into the pump inlet can be easily regulated, i.e., to permit adjusting of the relative water and air suction heads.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other aerators for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 1:
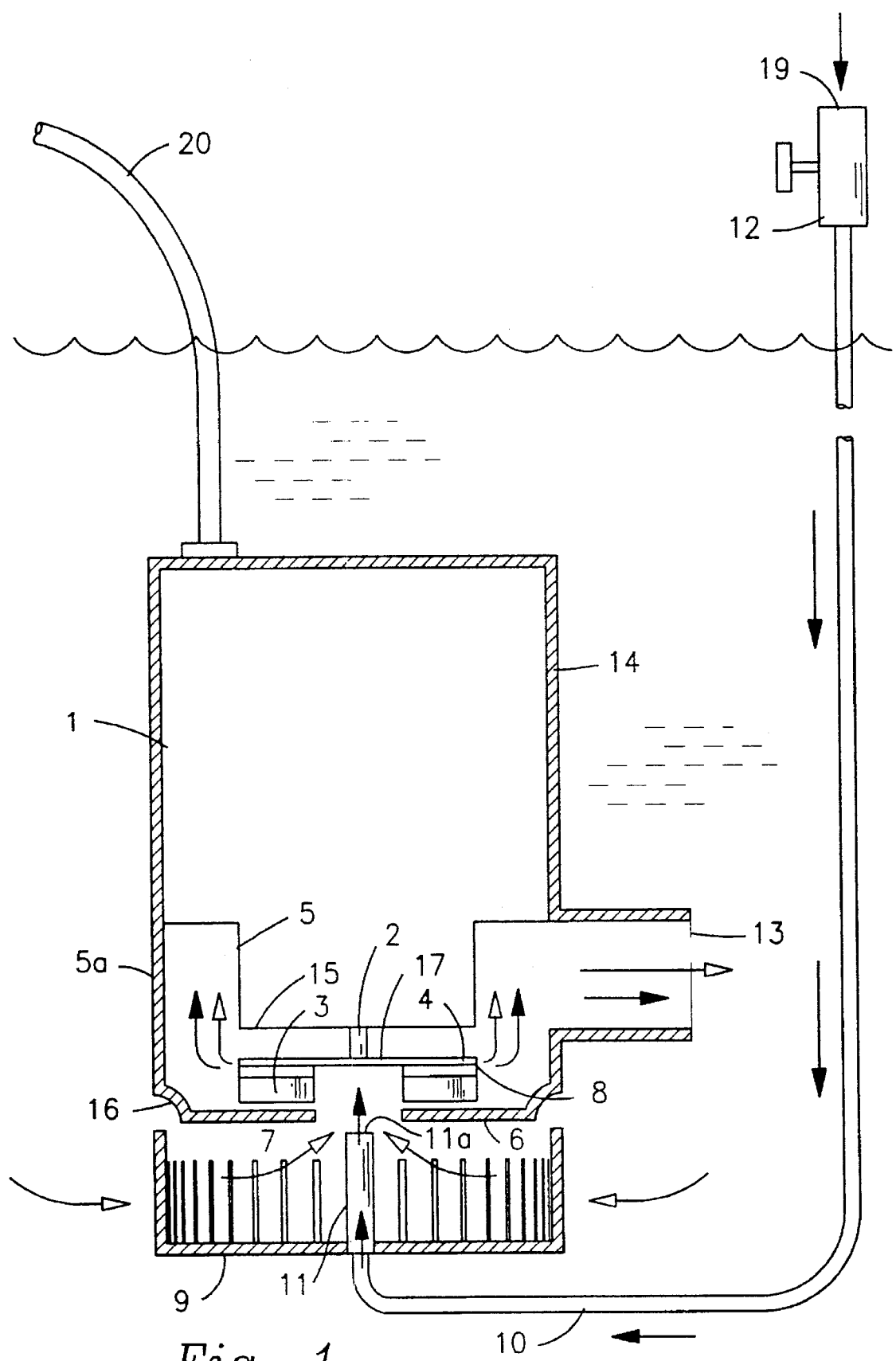
FIG. 1 is a schematic diagram showing the operation of the aerator according to the invention.

The present invention is directed to an aerator for a live bait well. As used herein, the terms aerator and oxygenator have the same meaning. The invention is based on the discovery that the introduction of a controlled amount of air into an upstream (suction) side leading to a centrifugal pump, which is a centrifugal rotary bilge pump as well known in the art, results in the ability to optimize the performance of the pump and the air/water mixture, resulting in a very fine mincing of air and water. The pump discharges an air/water mixture containing a large volume of very fine air bubbles.

These fine air bubbles are significantly better at oxygenating water than larger air bubbles as produced by conventional aerators since (1) the effective bubble surface area and thus air/water contact area is increased, (2) smaller bubbles take much longer to rise to the surface and thus remain in the water longer, (3) smaller bubbles are less likely to coalesce upon contact, and thus are likely to remain suspended in the form of fine bubbles, and (3) the presence of the ultra-fine bubbles during the mechanical churning during pumping has a synergistic effect resulting in enhanced oxygenation.

The term "centrifugal pump" as used herein is intended to mean a pump which utilizes the throwing force of a rapidly moving impeller. The liquid is pulled in at the center or eye of the impeller and is discharged at the outer rim of this impeller. By the time the liquid reaches the outer rim of the impeller, it has acquired considerable velocity. The liquid is then slowed down by being led through either a volute or a conical housing. The simplest method for converting dynamic pressure to static pressure is to slowly increase the volute delivery channel area (e.g., a taper of no greater than 8°). This is known as a diffuser and is often used on small pumps. As the velocity of the liquid decreases, its pressure increases. The shape of the outlet has the effect of changing the low-pressure, high velocity fluid to high pressure, low velocity. That is, some of the mechanical kinetic energy is transformed into mechanical potential energy. In other words, the velocity head is partially turned into pressure head.

The aerator of the present invention is characterized by the employment of the rapidly rotating impeller of the centrifugal pump to mince air and water. The precise manner in which the impeller minces the air and water and creates the ultra fine air bubbles is not understood, but it is logical to assume that the rapid changes of direction from (1) axial at the eye to (2) radial in the impeller to (3) axial between the impeller tip and the outlet to (4) radial at the water outlet, and also the changes in speeds, pressures; shear forces, and other forces acting within the impeller have an effect on the formation of bubbles.

In all cases the impeller is operated under conditions under which no cavitation (as conventionally defined) occurs, i.e., there is no reduction in pressure to the point where the hydrodynamic pressure of the water is dropped to below its vapor pressure. Cavitation most frequently occurs in a marine environment when the vapor pressure of the water is dropped below the vapor pressure of air behind a ship's propeller blade, such that air bubbles are formed. Strictly speaking, cavitation can occur when the pressure in a container of carbonated beverage is reduced such that dissolved gasses come out of solution and form carbon dioxide "cavities". For the purposes of the present invention, no such cavitation occurs. The impeller is operated under conditions where a smooth, continuous mincing of air and water occurs.

The centrifugal pumps as used in the present invention are basically similar to a wheel, with vanes or blades called impeller blades sandwiched between an upper and a lower housings. For ease of construction, one of the upper or lower impeller housings may be eliminated so long as the free upper or lower sides of the impeller blades are in close proximity to the impeller chamber housing. An impeller thus differs from a propeller mainly in that (1) an impeller operates using centrifugal force, while a propeller does not, and (2) an impeller has a upper and lower housing or case for throwing fluids out radially, while a propeller has only blades which pushes liquid in a direction axially parallel with the propeller shaft. A propeller type pump can not achieve the ultra-fine bubbles according to the present invention.

An impeller may be of either the centrifugal pump type or the compressor type, with centrifugal pump type impellers being greatly preferred. Pump impellers are generally cast in one piece with a hub; compressor impellers are generally fabricated.

With reference to the figures, the aerator 1 comprises a water impermeable motor casing 14. An electric motor (not shown) of any conventional design is mounted within the motor casing 14. The electric motor may be of any suitable construction such as the type utilized in a RULE bilge pump, for example, a RULE 360 GPH bilge pump. Basically, any conventionally available centrifugal pumps available in the fishing industry can be used for the purposes of the present invention. A major supplier of such pumps is E&B Discount Marine, Inc. of 201 Meadow Road, P.O. Box 3138, Edison, N.J., as found in the E & B Discount Marine, Inc. Catalog '95, pages 112–115 of which are incorporated herein by reference. The motor may be powered by any suitable means such as an internal battery, an external portable battery, or via electrical connections to the main electrical supply system of a boat (in which case the electric drive motor includes insulated electrical conductors 20). The ends of the electrical connection means 20 may be provided with electrically conductive clamps (not shown) whereby the clamps may be clamped to the terminals of an electric battery or other source of electrical power. The portable power supply 20a (not shown) may be provided in a casing which can be mated integral with the motor casing 14, or may be located outside the motor housing and inside or outside the live bait well, in which case external electrical connection means 20 are again required, The assembly may then be placed into the live bait well and anchored to the bottom thereof via suction cups.

A drive shaft 2 extends through the bottom of the motor casing 15 and is connected to a centrifugal rotary impeller 17.

An impeller casing or water flow directing means 5 is provided on the bottom of, and integrally connected to, the motor housing as shown in FIG. 1, and comprises a generally cylindrical outer wall portion 5a and a generally flat bottom portion 6. The impeller casing is shaped so as to encompass the impeller 17 and to define water inlet 7 and water outlet 13 areas. In the design as shown in FIG. 1, the inlet is immediately below, and co-axial with, shaft 2, and also immediately below the "eye" of the impeller 17. A lateral water outlet conduit 13 is provided in the impeller casing above the impeller for return of aerated water to the live bait well.

The impeller comprises a top disk-shaped impeller plate 4 which is fixed at its center to the drive shaft 2. The impeller 17 is provided with a plurality of impeller vanes 3. The vanes extend downwardly and are in close tolerance with the flat bottom portion 6 of the impeller casing. The top impeller plate 4 and the flat bottom portion 6 of the impeller casing thus define the axial flow directing boundaries of the impeller through which the impeller vanes urge the water.

Preferably, a strainer 9 of any suitable construction is mounted on the bottom of the impeller casing 5, 6 and an air tube 10 is attached to or permitted to extend through the strainer 9. The strainer merely serves to prevent bait fish from being drawn into the impeller. FIG. 1 shows one possible arrangement of air tube 10. A short piece of tubing, forming an air conduit 11 is permanently adhered to the inside of the strainer 9. Air conduit 11 is shown as having an inner diameter corresponding to the outer diameter of the flexible air tubing 10, so that tubing 10 can simply be inserted into air conduit 11 when it is desired to use the impeller pump as an aerator. Alternatively, the air tubing 10 can be disconnected from air conduit 11, in which case the impeller pump can be used as a conventional pump, such as for a bilge pump. Suitable retaining means for retaining the aerator at the desired location, preferably at the bottom of the live well, is provided, such as a lead weight, a snap fitting, or even a suction cup 18 mounted to the flat bottom of the strainer (see FIG. 2).

As shown, the air tube 10 is preferably a flexible transparent tube of a construction and material as readily available in pet stores for use in association with aquariums. Preferably, the flexible plastic air tube 10 is inserted into a flexible or rigid air conduit 11 which then mouths with the water inlet 7 of the impeller casing. The advantage of using a separate air conduit 11 separate from the air tube 10 is that this permits moving, bending, detaching, and replacing the air tube 10 without disturbing the relationship between the air inlet established by the air conduit 11 at the water inlet 7 of the impeller housing.

The air tube 10 and air conduit 11 may be of any diameter, so long as the opening of the air conduit 11 at the water inlet 7 is within a critical range required for operation of the aerator. That is, if the diameter of the air hose is too large, even if the air flow metering means 12 are provided, and even if a small diameter opening of a large diameter air hose were provided at the water inlet 7, the volume of air in the air tube 10 will make it possible for the pump to oscillate or surge, alternatively drawing large bubbles and then no air into the impeller. Further, if the diameter of the air tube 10 is too small, a sufficient supply of air to the impeller for optimal oxygenation is not always possible. This is not conducive to the production of fine bubbles and the smooth operation of the aerator.

The air tube 10 has an opening in communication with the air, which opening is preferably above the fluid level of the bait tank or live well, but which may extend, e.g., out the side or bottom of the bait tank. The lower outlet of the air tube supplies air to the inlet of the impeller housing 7, either directly or via air conduit 11.

It can be seen that the air tube 10 is much smaller than inlet 7, and is preferably co-axial with the drive shaft, though it may be laterally offset from the center of inlet 7.

Figure 2:
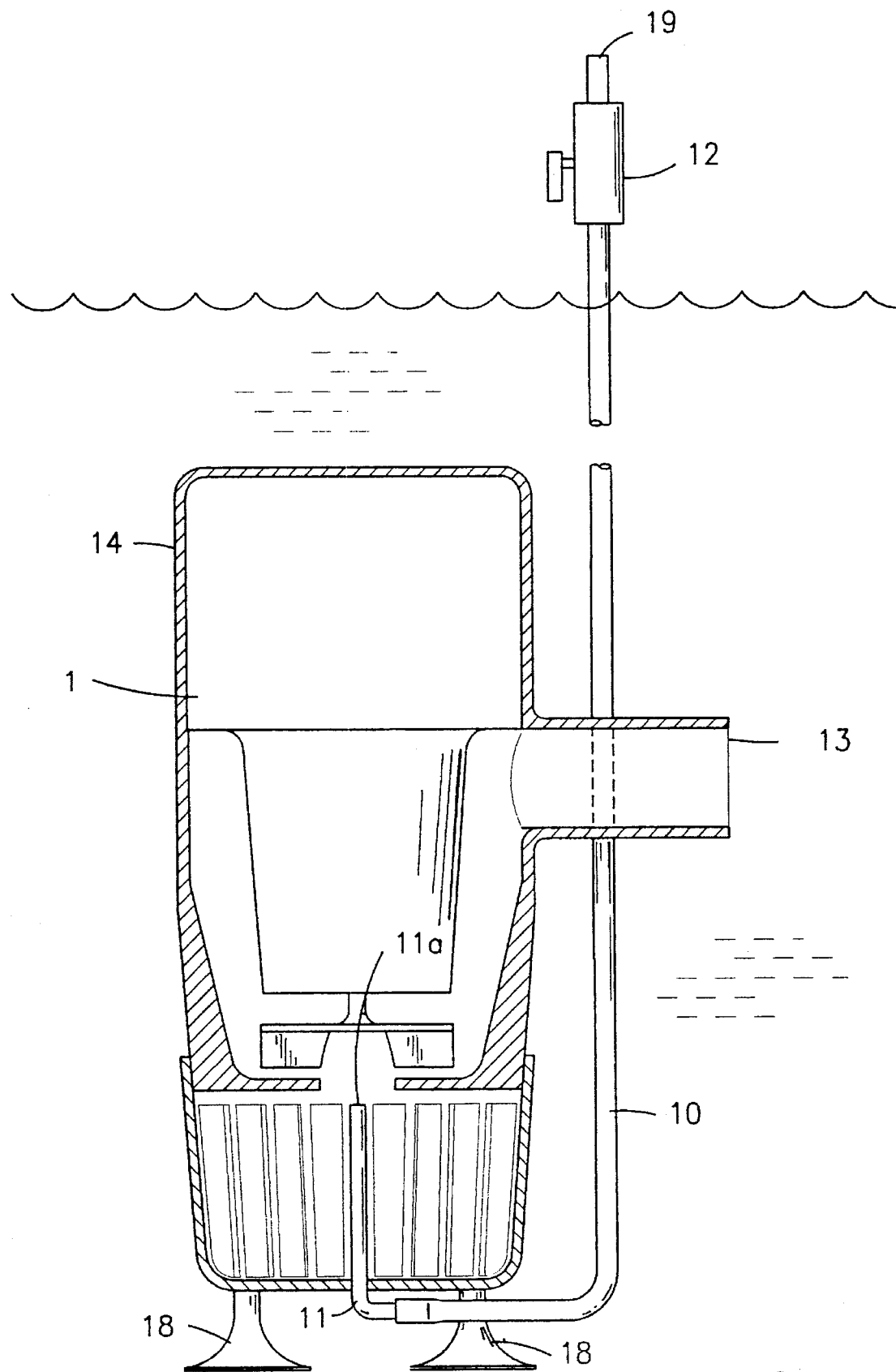
FIG. 2 is a partial cut-away showing a preferred design of the aerator according to the invention.
Figure 3:
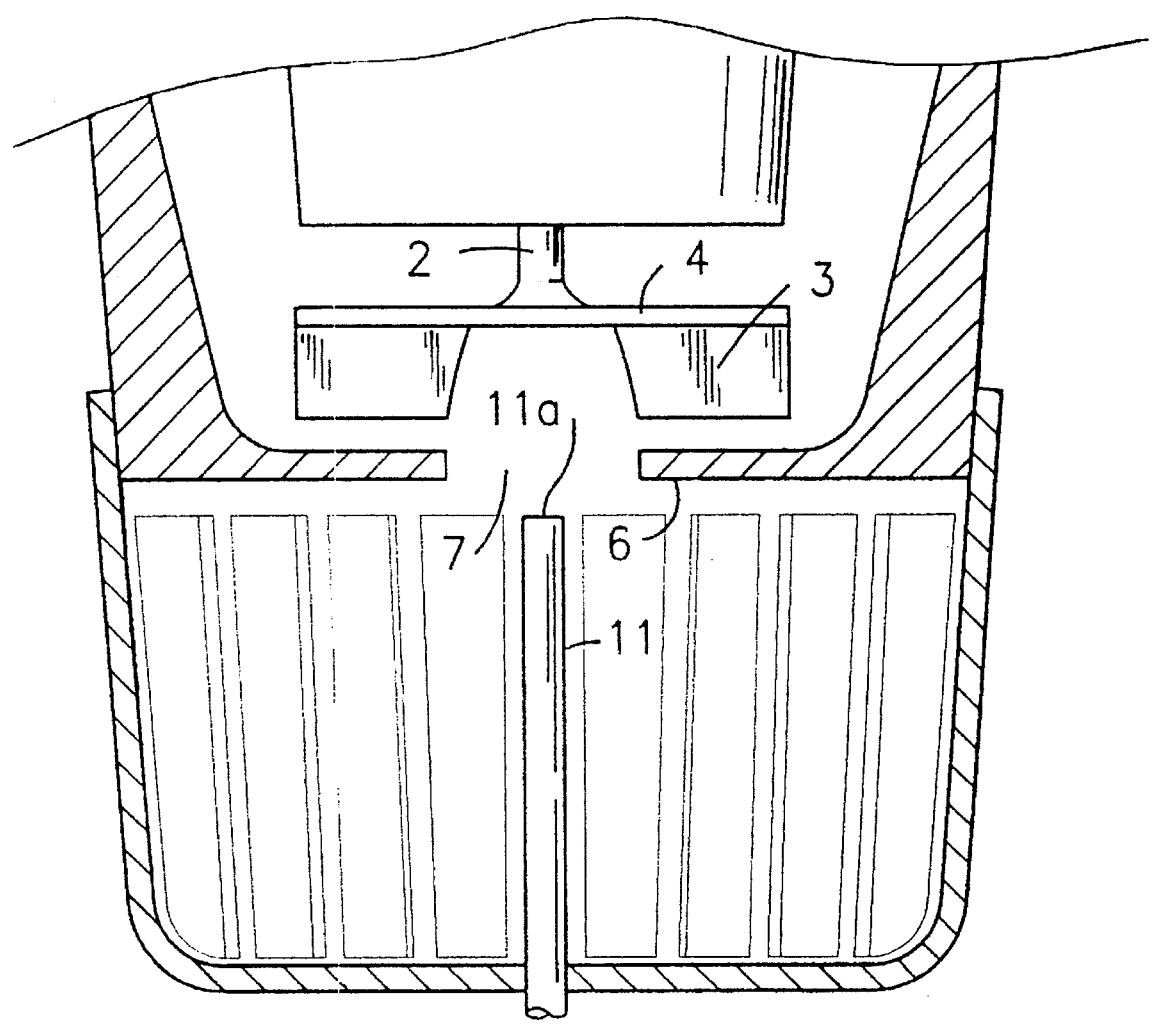
FIG. 3 is an exploded view of the water inlet, air inlet and impeller "eye" of FIG. 2.

The approximate relationship between the essential components are shown in FIGS. 2 and 3. FIG. 3 is an exploded view at the water/air inlet corresponding to FIG. 2. In its simplest form, air conduit 11 is approximately ⅛ inch in inner diameter and ¼ inch in outer diameter. The air conduit 11 may have a wider body so long as air outlet 11a is approximately this diameter or permits a corresponding rate of flow. Alternatives include a wide body with a nozzle shaped outlet 11a, a wider body with a series of outlets for emission of fine bubbles, an opening covered with a screen so that only fine bubbles are emitted from the air conduit 11, an opening in which the outlet 11a is of the tube is flattened to provide a slit shaped outlet, etc. As can be seen, the space between the impeller blades 3 and lower impeller housing 6 is very small, preferably even smaller than shown in FIG. 3. Critical to the present invention is (1) the narrowness or restricted flow of the air at the water inlet 7 so that no relatively large bubbles are injected into the impeller, (2) the narrowness of the air outlet 11a at the water inlet in comparison to the size of the water inlet 7 so that good suction head of the pump is not disturbed and so that flow into the pump is not impeded, and (3) the close proximity of the air 11a outlet to the water inlet as defined by the plane of the lower impeller housing 6. That is, if the flow of the water is insufficient at the air outlet 11a, there is insufficient suction to cause the controlled, smooth, continuous drawing of air into impeller 17. The horizontal separation between the top of the impeller blades 3 and the plane of the lower impeller housing 6 is preferably within ¼ of the diameter of water inlet 7, more preferably within ⅙ the diameter of the water inlet 7, and most preferably within ¹/₁₀ of the diameter of the water inlet 7, in the case that the pump is horizontal.

The operation of the aerator will now be described with reference to the drawings. As seen in FIG. 1, when the electric motor (not shown) is energized, drive shaft 2 rotates causing corresponding rotation of the impeller 17 whereby water is drawn into the inlet opening 7, is accelerated by the impeller vanes 4, and is slung out at the tip of the vanes 8 at which point the water has achieved maximum velocity. The water is redirected upwardly, preferably by a curvature or angularity 16 in the inner wall of the impeller housing 5, and is directed upwardly towards the water outlet 13. While traveling axially upwardly the velocity of the water is reduced and, as a consequence the potential pressure is increased.

Of course, the aerator 1 may be placed in a portable bait container such as a "minnow bucket", placed within a bait well built into a boat, or even may be used as a temporary aerator for a fish aquarium. Further, the aerator may be used in any form of live box to aerate the water therein.

As the impeller begins to pump water in through the water inlet 7 and out through the water outlet 13, a reduced pressure or suction head will form at the water inlet 7. Once the absolute pressure at the water inlet 7 drops below the air pressure at air inlet 19, air enters through the air inlet 19 and travels through the air tube 10 and air conduit 11 and enters into the impeller housing through the water inlet 7. Initially, air flow metering means 12 may be partially closed off so that only a part of the potential air flow enters into the air inlet 19. As this partial air flow becomes established (which may take only a few seconds), air flow metering means 12 is operated so as to permit that amount of air flow which will optimally oxygenate the water.

Optimal oxygenation of the water can be determined visually. An important principle of the present invention is that optimal oxygenation does not depend upon optimal air flow through the air tube 10. Rather, optimal oxygenation depends upon the introduction into the live well of very finely divided air, i.e., ultra fine air bubbles. The air bubbles should have the appearance of a fine mist or fog. The air bubbles are so small as to remain under water for a long period of time, and optimally saturate the water with oxygen. This permits the maintenance in the bait well of two to four times the number of bait fish which had previously been though possible with the best conventionally available oxygenators.

Thus, air flow should be controlled to the point of achieving the maximum amount of the finest air bubbles. When air flow increases to the point where large bubbles are expelled from the oxygenator, the air flow should be reduced.

The output from the pump is smooth and non-turbulent, so as to provide optimal habitation conditions for live bait, i.e., there is no surge, there is no high turbulence, and the flow is only so great as necessary for the recirculation of water and for the even distribution of oxygen throughout the live bait well.

The oxygenator according to the present invention may be custom built or may be constructed by retrofitting a tube and modified strainer assembly to a known centrifugal pump such as a RULE bilge pump. In modifying a bilge pump for use as an aerator, a means for keeping the pump below water may be provided. This means may be a suction cup 18 or may be a ballast weight which may in part be a battery assembly 27 (see FIG. 3) of sufficient weight to change the buoyancy of the pump from positive to net negative. The battery assembly 27 may be fixed in the lower end of the strainer by any known means, such as by gluing or bolting.

Further variations of the oxygenator design may be envisioned within the parameters set forth above. For example, it is a given that the oxygenator will be powered by an electric motor, typically a submersible electric motor. The motor is conventionally situated above the impeller. The motor is connected to the impeller by means of a vertical shaft. Since the shaft is connected to the impeller at one side of the "eye", and since air must be introduced at the "eye", it may be expected that air must be introduced into the impeller from the opposite side of the impeller, i.e., from below. In practice, this is true. That is, it would be possible to construct an aerator wherein a hollow drive shaft extends above the surface of the water for communication with atmosphere, and the drive shaft is connected to the top of the impeller in such a way as to permit introduction of air from the upper side of the impeller. However, to drive the shaft, it would be necessary to provide pulleys and a complex bearing arrangement, or to have the motor situated above the water in which case it would protrude from the bait well, or to have a submersible pump with an upper passage for the hollow drive shaft, which passage would require continuous seal monitoring and would be prone to leakage. Accordingly, providing air from above the impeller with an "upright" pump (as described above) may be possible, but in practice supplying air from below is much more practical.

Figure 4:
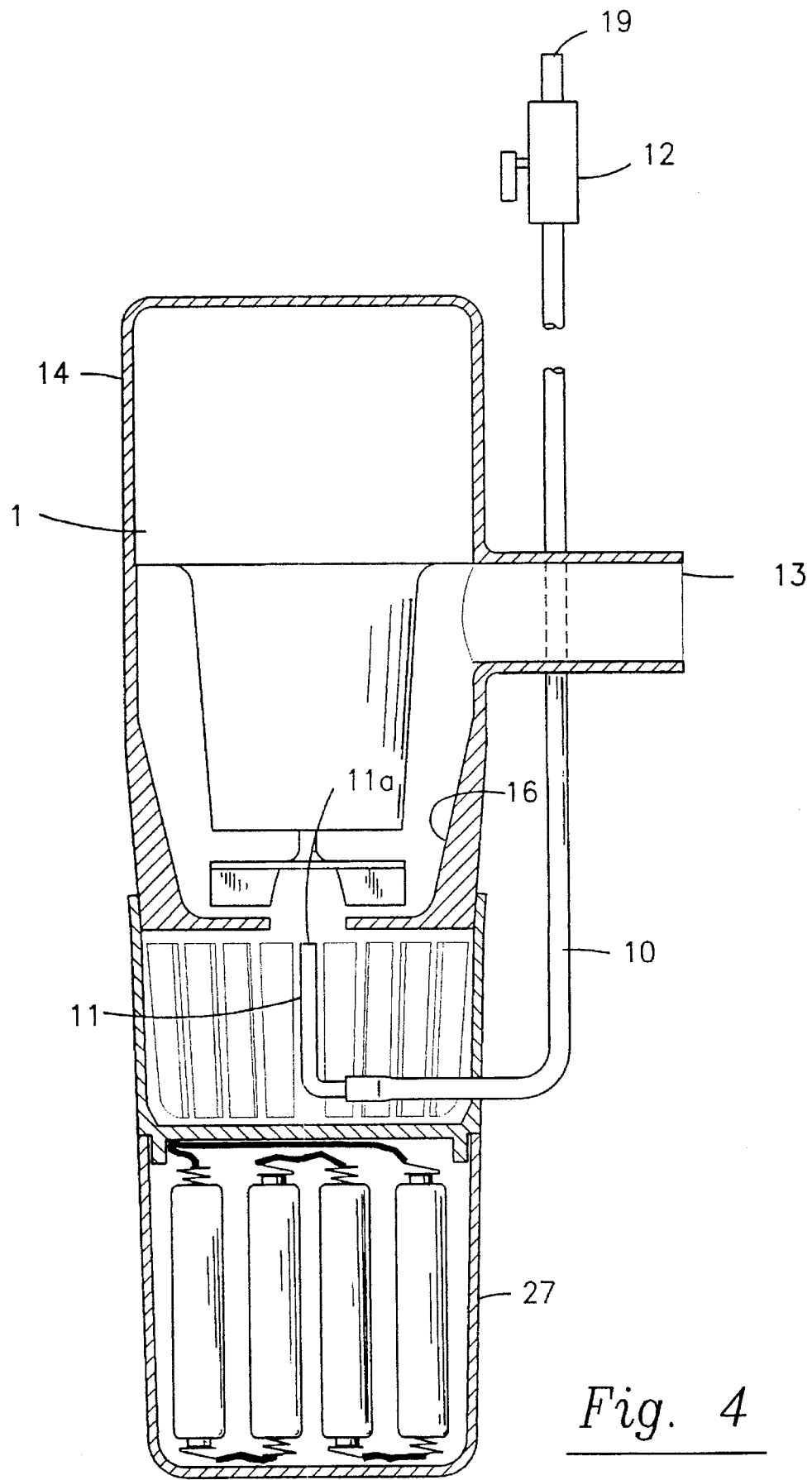
FIG. 4 is a cross-sectional view of a battery powered aerator according to the invention.
Figure 5:
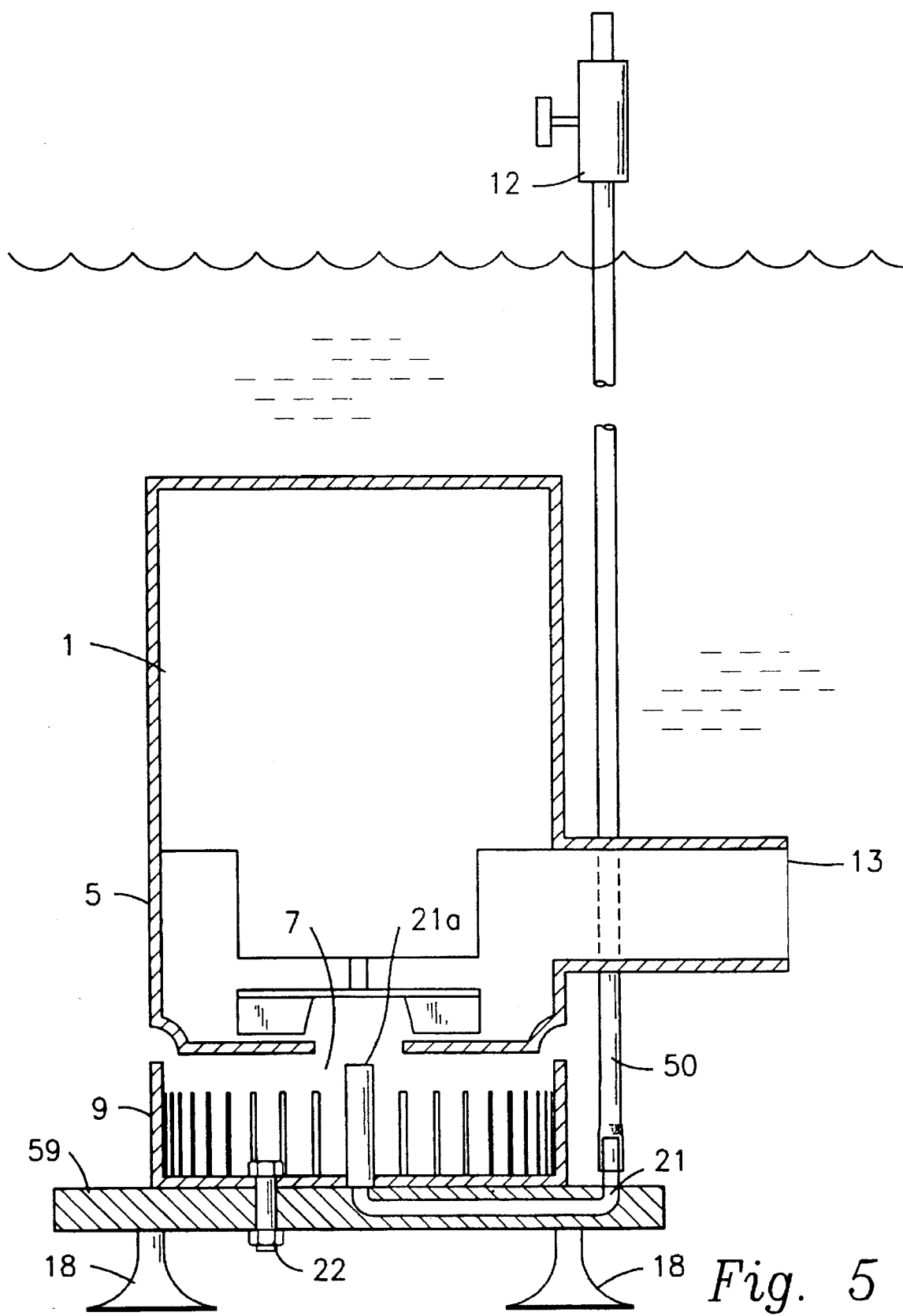
FIG. 5 shows a preferred conversion of a conventional pump into an aerator.

An example of a preferred aerator according the invention will now be described with reference to FIG. 4, in which a conventional bilge pump comprising motor housing 1, impeller housing 5 and strainer 9 is modified in accordance with the present invention. The modification comprises attaching to the bilge pump means for introducing a metered amount of air to the bilge pump. This means comprises platform 59 which is attached to the bottom of strainer 9 by means of rivets 22, suction cups 18 for attaching the platform to the floor of the bait well, air tube 50, and air conduit 21 and metering device 12. Air tube 50 is preferably a soft pliable transparent plastic to as to permit flexibility in the installation and positioning of aerator 1 in relation to metering means 12. Air tube 21 is preferably a rigid metal or plastic tube so as to facilitate the sliding of air tube 50 over one end of air conduit 21, and so that the end of the tube providing air to the water inlet 7 remains fixed in its position with respect to the water inlet 7. Air conduit 21, when used with a RULE 360 pump, preferably has a ⅛ inch inner diameter and a ¼ inch outer diameter.

In one embodiment of the invention air air conduit 21 and platform 59 are cast as a single piece. Where unitary casting is not desired, air conduit 21 can be placed into a mold and platform 59 can be injection molded around it. It is preferred that the outlet 21a of tubing 21 be provided in the center of water inlet 7, and that the inlet of tubing 50 be provided as close to the cylindrical outer wall of strainer 9 as possible so as to provide a compact structure.

With the motor and impeller running, a suction is created at the inlet "eye" 7 of the impeller. This suction acts not only to draw water in through the eye, but also reduces the pressure on the outlet side of the air tube to permit air to be drawn in through metering means 12 and air tubes 20 and air conduit 21. The suction may be so great that too much air is drawn into the impeller, such that fine bubbles are not formed. In this case, the amount of air drawn into the air tubes 20 and air conduit 21 can be regulated by closing metering means 12 until only that amount of air desired is drawn into the tube. On the other hand, if too little air flows to the impeller and a greater air flow is desired, metering 12 can be opened until optimal aeration is achieved.

The distance between the strainer 9 and the lower transverse impeller housing 6 is approximately 1 to ½ inch, and depending upon the pump capacity, may be as small as ¼ inch.

Of course, the aerator 16 may be placed within a bait well built into a boat or even may be used as a temporary aerator for a fish aquarium. Further, the aerator may be used in any form of live box to aerate the water therein.

The mixture of water and air which enters the impeller is violently agitated and leaves the outlet 13 of the impeller pump in the form of water with very fine air bubbles giving the appearance of fogging the water. In some cases the air bubbles may be so fine that it will be difficult to tell whether the pump is aerating or not. In that case, placement of a hand in front of the outlet 13 will either cause a rapid buildup of bubbles on the skin, showing that the aerator is working, or will result in no bubbles forming on the skin, in which case no aeration is occurring.

While a RULE 360 works well for large bait tanks as found on fishing boats, the amount of aeration would be too large for smaller bait tanks such as "guppy buckets". In that case, a correspondingly smaller capacity pump, such as a 40 gpm pump, may be used.

Various structures and connections may be resorted to. All that is important is that air and water are intimately and violently minced within an impeller. The pump may be operated right-side-up (with the water inlet opening downwardly), up-side-down (with the water inlet opening upwardly) or sideways, so long as metering means is provided to adjust and optimize the flow of air.

The invention is applicable to live bait wells for fresh water fish as well as for salt water fish, though best results have been observed with salt water. The invention is not limited to bait wells, and is applicable to aeration of aquariums, lobster holding tanks, etc.

The aerator of the present invention is rather powerful and need not be run full time. The aerator may be energized cyclically in a pattern set by a timer. Alternatively, the aerator may be energized responsive to sensor input, such as oxygen saturation sensors, as discussed in, e.g., U.S. Pat. No. 5,320,068, which teaches a system for the automatic control of oxygenation for agriculture.

As can be seen from the above disclosure, the metering means permits the pump to be used in the orientation for which it was designed, i.e., right-side-up, at any depth, and in any type of water, i.e., fresh, salt, or brackish.

Although less preferred, in an other embodiment of the invention the air channel outlet is connected to the water inlet of a through-hull aerator. In this type of aerator, aerated water is supplied to a live well via a through-hull water conduit. In accordance with the present invention, the air conduit is placed perpendicularly across the flow of the water inlet conduit, such that a venturi effect causes air to be drawn into the water conduit and thence into the impeller. The characteristic feature of this embodiment in accordance with the present invention is the provision of an air metering means such that the optimal amount of air flow can be selected.

Although the aerator was first designed as an aerator for bait fish in a live well, it will be readily apparent that the device is capable of use in a number of other applications, such as in mincing various liquids and gasses. Although this invention has been described in its preferred form with a certain degree of particularity with respect to an aerator, it is understood that the present disclosure of the preferred form has been made only by way of example and that numerous changes in the details of structures and the composition of the combination may be resorted to without departing from the spirit and scope of the invention.

Now that the invention has been described,
What is claimed is:

1. An aerator device for aerating the water supply of aquatic organisms, said device comprising:
   (a) a centrifugal type pump for pumping fluids, said pump comprising
      an impeller comprising an impeller disk and a plurality of radial impeller vanes attached to said impeller disk, the vanes having inner and outer edges, the respective vanes projecting generally perpendicularly from said impeller disk and having flow passages defined therebetween, the inner edges of said plurality of vanes defining an impeller inlet eye;
      fluid-tight means for driving said impeller;
      an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall including an aperture defining a fluid inlet, said outer wall including an aperture defining a fluid outlet, said transverse wall having a planar surface area in close proximity to said impeller vanes; and
   (b) an air channel having an air inlet in communication with air, having an air outlet in close proximity to said aperture in said transverse wall defining a fluid inlet, and an air flow metering means between said air channel inlet and outlet.

2. An aerator device as in claim 1, wherein the diameter of said air channel at said air outlet is approximately ⅛ inch.

3. An aerator device as in claim 1, wherein said air channel is flexible plastic tubing having an outer diameter of approximately ¼ inch.

4. An aerator device as in claim 1, wherein said aerator device is provided with suction cup means.

5. An aerator device as in claim 1, wherein at least a part of said air channel comprises flexible tubing.

6. The aerator device as in claim 1, wherein the capacity of said centrifugal type pump is between 40 gallons per hour and 3700 gallons per hour.

7. A process for aeration of aquatic organisms in a volume of water, said process comprising
   (I) providing an aerator, said aerator comprising:
      (a) a centrifugal type pump for pumping fluids, said pump comprising:
         an impeller comprising an impeller disk and a plurality of radial impeller vanes attached to said impeller disk, the vanes having inner and outer edges, the respective vanes projecting generally perpendicularly from said impeller disk and having flow passages defined therebetween, the inner edges of said plurality of vanes defining an impeller inlet eye;
         fluid-tight means for driving said impeller;
         an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall including an aperture defining a fluid inlet, said outer wall including an aperture defining a fluid outlet, said transverse wall having a planar surface in close proximity to said impeller vanes; and
      (b) an air channel having an air inlet in communication with air, having an air outlet in close proximity to said aperture in said transverse wall defining a fluid inlet, and an air flow metering means between said air channel inlet and outlet;
   (ii) submerging said fluid inlet in water;
   (iii) submerging said fluid outlet in the volume of water containing aquatic organisms to be aerated;
   (iv) energizing said means for driving said impeller to cause rotation of said impeller and thereby establish a suction head at said fluid inlet of said impeller, and
   (v) adjusting said metering means to regulate air flow through said air channel and through said impeller, thereby delivering a mixture of air and water to said aquatic organisms from said fluid outlet in the form of fine air bubbles in water.

8. An aerator device, said device comprising:
   (a) a portable centrifugal type pump for pumping fluids, said pump comprising
      an impeller comprising an impeller disk and a plurality of radial impeller vanes attached to said impeller disk, the vanes having inner and outer edges, the respective vanes projecting generally perpendicularly from said impeller disk and having flow passages defined therebetween, the inner edges of said plurality of vanes defining an impeller inlet eye;
      fluid-tight means for driving said impeller;
      an impeller housing generally surrounding said impeller and comprising at least an outer wall and a transverse wall, said transverse wall being generally transverse to the axis of rotation of the impeller and on the side of the impeller opposite the side upon which the drive means is provided, said transverse wall including an aperture defining a fluid inlet, said outer wall including an aperture defining a fluid outlet, said transverse wall having a planar surface area in close proximity to said impeller vanes;
   (b) an air channel having an air inlet in communication with air, having an air outlet in close proximity to said aperture in said transverse wall defining a fluid inlet, and an air flow metering means between said air channel inlet and outlet,
   wherein the capacity of said centrifugal type pump is up to 360 gallons per hour.

* * * * *